United States Patent

Suzuki et al.

Patent Number: 5,372,015
Date of Patent: Dec. 13, 1994

[54] AIR CONDITIONER CONTROLLER

[75] Inventors: Kazuo Suzuki, Kanagawa; Tetsuo Sano, Shizuoka, both of Japan

[73] Assignee: Kabushiki Kaisha Toshiba, Kawasaki, Japan

[21] Appl. No.: 907,538

[22] Filed: Jul. 2, 1992

[30] Foreign Application Priority Data

Jul. 5, 1991 [JP] Japan .................. 3-164917
Jul. 5, 1991 [JP] Japan .................. 3-164921

[51] Int. Cl.$^5$ .................. G06F 15/20; F25B 1/00
[52] U.S. Cl. .................. 62/228.4; 236/78 D; 395/21
[58] Field of Search .................. 395/21, 22, 903, 906, 395/907; 236/78 R, 78 D; 364/557, 505; 62/228.4

[56] References Cited

U.S. PATENT DOCUMENTS 4,914,924  4/1990  Takahashi .................. 395/903 X
5,159,660  10/1992  Lu et al. .................. 395/906 X

FOREIGN PATENT DOCUMENTS 63-131942  11/1986  Japan .

OTHER PUBLICATIONS

Bhat et al, IEEE Control Systems Magazine, pp. 24–29, 1990.
Ward et al, Computers Industrial Engineering pp. 205–207, 1990.

Primary Examiner—William E. Wayner
Attorney, Agent, or Firm—Foley & Lardner

[57] ABSTRACT

A controller for controlling an air conditioner comprises a room temperature sensor for measuring a room temperature, a room temperature change computation circuit for computing a difference between the room temperature and a set temperature, an outdoor temperature sensor for measuring an outdoor temperature, a neural network for computing load on the air conditioner according to the temperature change, outdoor temperature, and room temperature, and a controller for controlling, according to the computed load, the operation frequency of a coolant compressor by controlling a compressor motor through a variable frequency circuit, thereby speedily bringing the room temperature to the set temperature and stably maintaining the room temperature at the set temperature. The neural network learns various operation characteristics of a refrigerating cycle of the air conditioner, and according to a result of the learning, controls the air conditioner.

8 Claims, 7 Drawing Sheets

| | LIGHT LOAD | LIGHT-MEDIUM LOAD | MEDIUM LOAD | MEDIUM-HEAVY LOAD | HEAVY LOAD | UNIFORM |
|---|---|---|---|---|---|---|
| $S_0$ | 10 | 10 | 10 | 10 | 10 | 10 |
| $S_1$ | 15 | 30 | 30 | 30 | 43 | 25 |
| $S_2$ | 20 | 50 | 50 | 50 | 76 | 40 |
| $S_3$ | 25 | 55 | 70 | 70 | 109 | 55 |
| $S_4$ | 30 | 60 | 90 | 90 | 142 | 70 |
| $S_5$ | 36 | 65 | 95 | 110 | 148 | 85 |
| $S_6$ | 43 | 70 | 100 | 130 | 155 | 100 |
| $S_7$ | 51 | 90 | 105 | 135 | 162 | 115 |
| $S_8$ | 59 | 110 | 110 | 140 | 170 | 130 |
| $S_9$ | 92 | 130 | 130 | 145 | 175 | 145 |
| $S_{10}$ | 125 | 150 | 150 | 150 | 180 | 160 |
| $S_{11}$ | 158 | 170 | 170 | 170 | 185 | 175 |
| $S_{12}$ | 190 | 190 | 190 | 190 | 190 | 190 |

AIR CONDITIONER CONTROLLER

BACKGROUND OF THE INVENTION

1. Field of the Invention

This invention relates to a controller for controlling an air conditioner, employing a neural network for learning different characteristics of the air conditioner and best controls the operating conditions such as superheat, performance, defrosting, etc., of the air conditioner according to a result of the learning. The invention particularly relates to an air conditioner controller that speedily brings the temperature of an air-conditioned room to a set temperature and stably maintains the set temperature according to a result of learning carried out through a neural network.

2. Description of the Prior Art

Control algorithms and control constants for an air conditioner are usually determined by laboratory tests.

Figure 1:
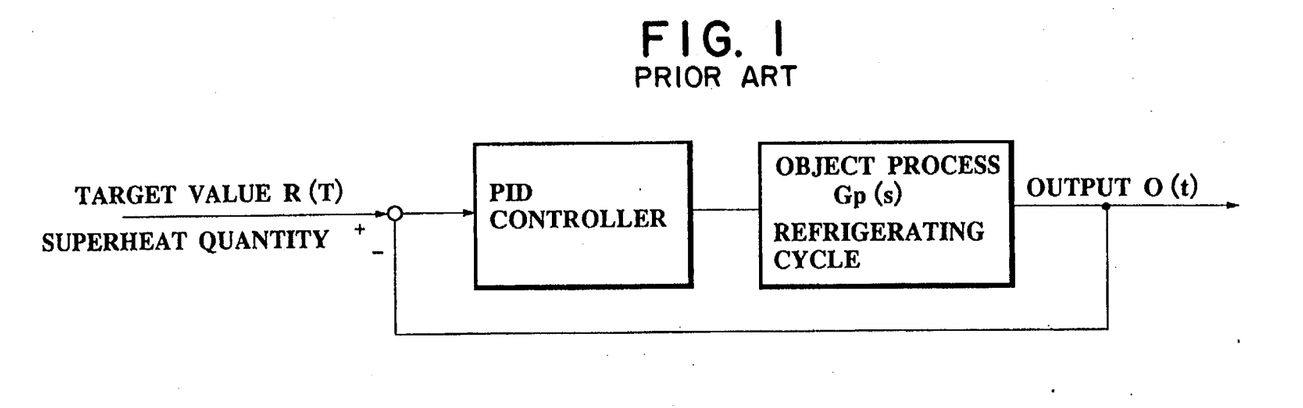
FIG. 1 is a view showing a control method for controlling a refrigerating cycle by PID controller, according to a prior art.

FIG. 1 shows an example of a conventional controller for controlling an air conditioner. This controller employs a PID (proportional plus integral plus derivative) controller to control an object process (a refrigerating cycle) of the air conditioner. Control sequences and constants such as an integral time for the PID controller are determined according to laboratory tests.

In actual use of the air conditioner with the controller, environmental and operating conditions of the air conditioner frequently differ from those studied in laboratories. For example, the length of piping, the quantity of a coolant, and weather conditions involving rain, wind, and snow may not be equal to those used by laboratory tests. In this case, control constants obtained from the laboratory tests will be insufficient to properly control the air conditioner.

This problem will be explained with reference to controlling the operation frequency of a compressor of the air conditioner.

The compressor operation frequency is controlled to control the performance of the air conditioner, and a variable range of the operation frequency expands year by year. The conventional controller uniquely controls the frequency according to a difference between a room temperature and a set temperature.

Figure 2A:
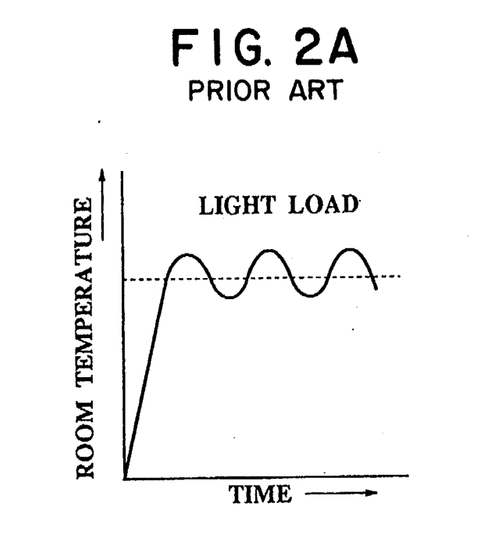
FIGS. 2a-2c are views showing room temperature controlling states according to the prior art.
Figures 2B, 2C:
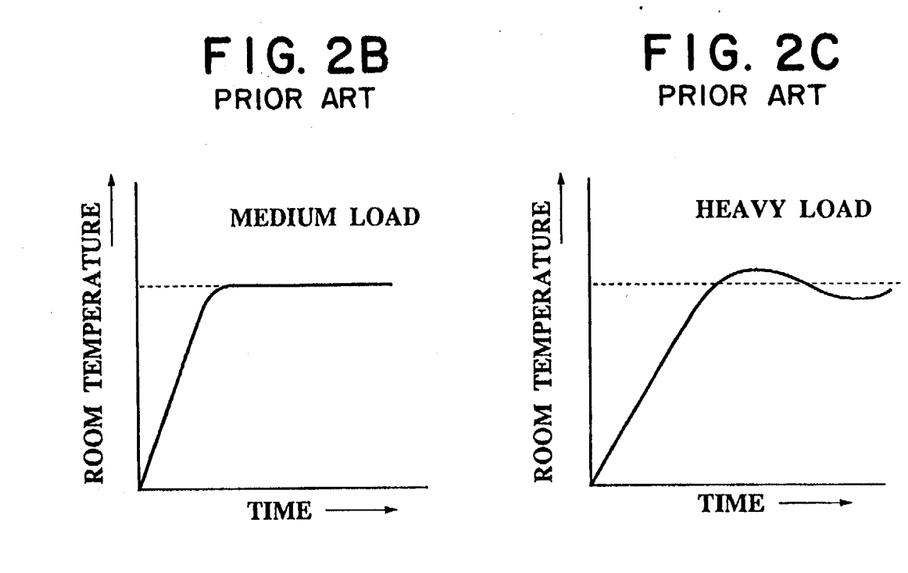

FIGS. 2a to 2c show control modes of the conventional air conditioner controller. A light-load mode is for air-conditioning a sunlit south-facing room in warm seasons such as spring, or a properly insulated small room. The light-load mode widely changes the performance of the air conditioner in response to even a small change in load on the air conditioner. This results in repeatedly hunting a set temperature.

A heavy-load mode is for air-conditioning a poorly sunlit north-facing room in cold weather, or a badly insulated large room. The heavy-load mode narrowly changes the performance of the air conditioner in response to a change in load on the air conditioner, to take a long time to reach a set temperature. The room temperature slowly changes around the set temperature and is hardly stabilized.

Signals transmitted between an indoor unit and an outdoor unit of the air conditioner provide a limited quantity of information. With this limited information, the air conditioner controller must control the operation frequency of the compressor disposed in the outdoor unit. This is the reason why the conventional air conditioner controller, which uniquely uses a difference between a set temperature and a room temperature, is insufficient to deal with light or heavy load on the air conditioner.

Namely, the conventional air conditioner controller is unable to follow load fluctuations caused by seasonal changes or by the location of an air-conditioned room, and unstably hunts a set temperature or achieves a slow response.

SUMMARY OF THE INVENTION

An object of the invention is to provide a controller for properly controlling the performance of an air conditioner according to a result of learning carried out through a neural network, so that the temperature of an air-conditioned room may speedily approach a set temperature and be stably maintained at the set temperature.

Another object of the invention is to provide a controller for best controlling various operating conditions of a refrigerating cycle of an air conditioner according to a result of learning carried out through a neural network.

To achieve these objects, a first aspect of the invention provides a controller for controlling an air conditioner, comprising load computation means employing a neural network for learning operation characteristics of the air conditioner according to a difference between the temperature of an air-conditioned room and a set temperature, a temporal change in the temperature difference, and an outdoor temperature, and computing load on the air conditioner according to a result of the learning; and control means for controlling the performance of the air conditioner by controlling the operation frequency of a coolant compressor according to the load computed by the load computation means, thereby speedily bringing the room temperature to the set temperature and stably maintaining the room temperature at the set temperature.

According to this aspect of the invention, the neural network learns the characteristics of the air conditioner according to a difference between a room temperature and a set temperature, a temporal change in the temperature difference, and an outdoor temperature, and computes load on the air conditioner. According to the load, the operation frequency of the compressor is controlled to quickly bring the room temperature to the set temperature and stably maintain the room temperature at the set temperature.

A second aspect of the invention provides a controller for controlling an air conditioner, comprising a neural network for learning various operation characteristics of a refrigerating cycle of the air conditioner; and control means for controlling the air conditioner according to a result of the learning.

According to this aspect of the invention, the neural network learns various operating characteristics of the refrigerating cycle of the air conditioner, and the air conditioner is controlled according to a result of the learning. Accordingly, the air conditioner can be best controlled for various operating conditions according to a selected optimum control constant.

These and other objects, features and advantages of the present invention will be more apparent from the following detailed description of preferred embodiments in conjunction with the accompanying drawings.

DETAILED DESCRIPTION OF THE EMBODIMENTS

Figure 3:
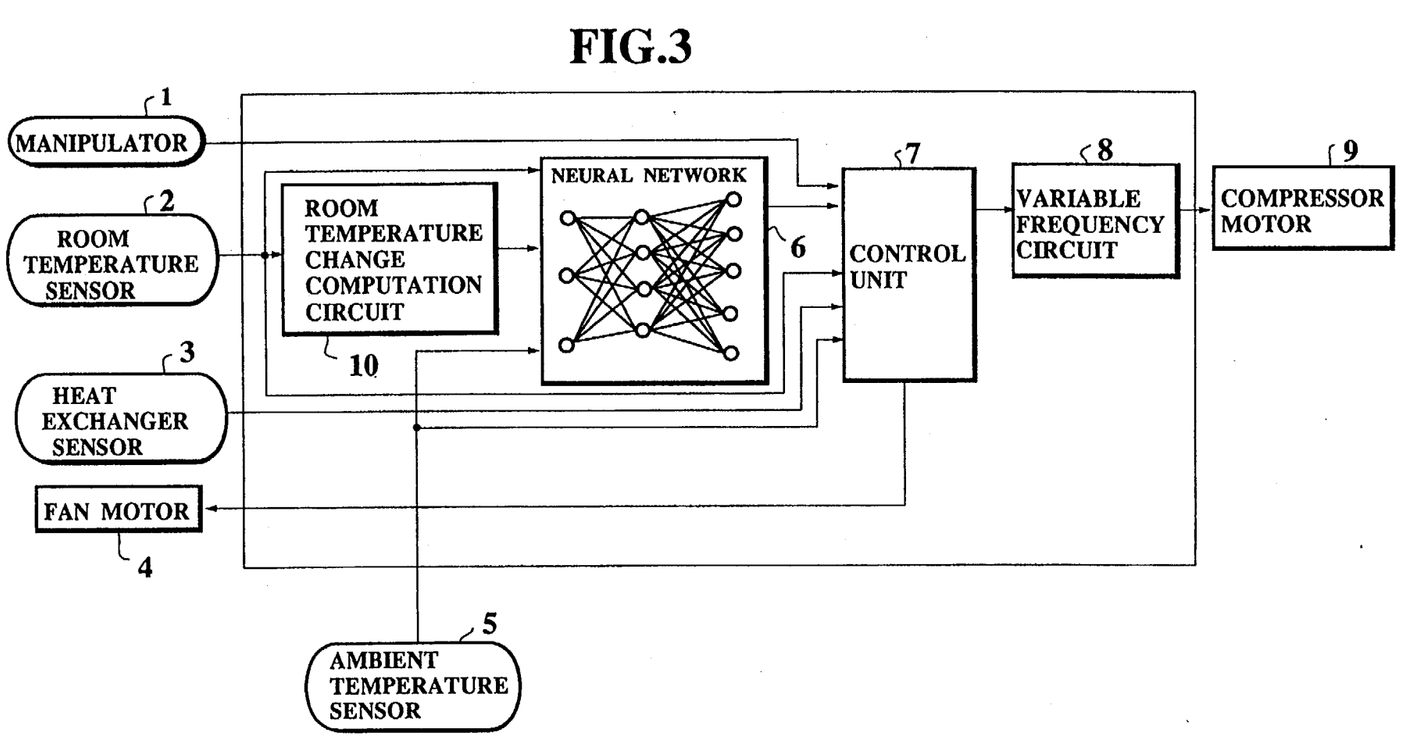
FIG. 3 is a view showing an air conditioner controller according to a first embodiment of the invention.

FIG. 3 is a view showing an air conditioner controller according to a first embodiment of the invention.

The air conditioner controller comprises a manipulator 1 such as a remote control unit controlled by a user for starting and stopping an air conditioner and setting required conditions such as a temperature and an air flow rate, a room temperature sensor 2 for measuring the temperature of an air-conditioned room, a heat exchanger sensor 3 for measuring the temperature of an indoor heat exchanger, used for, for example, preventing a cool wind during a heating operation, a fan motor 4 for blowing air, and an outdoor temperature sensor 5 for measuring an outdoor temperature.

The room temperature measured by the sensor 2 is sent to a room temperature change computation circuit 10, which computes a change in the room temperature and supplies the computed result to a neural network 6.

The neural network 6 receives the temperature change from the circuit 10, the room temperature from the sensor 2, and the outdoor temperature from the sensor 5, and provides an output to a control unit 7. The control unit 7 provides a variable frequency circuit 8 with a control signal. According to the control signal, the circuit 8 controls a coolant compressor motor 9.

Figure 4:
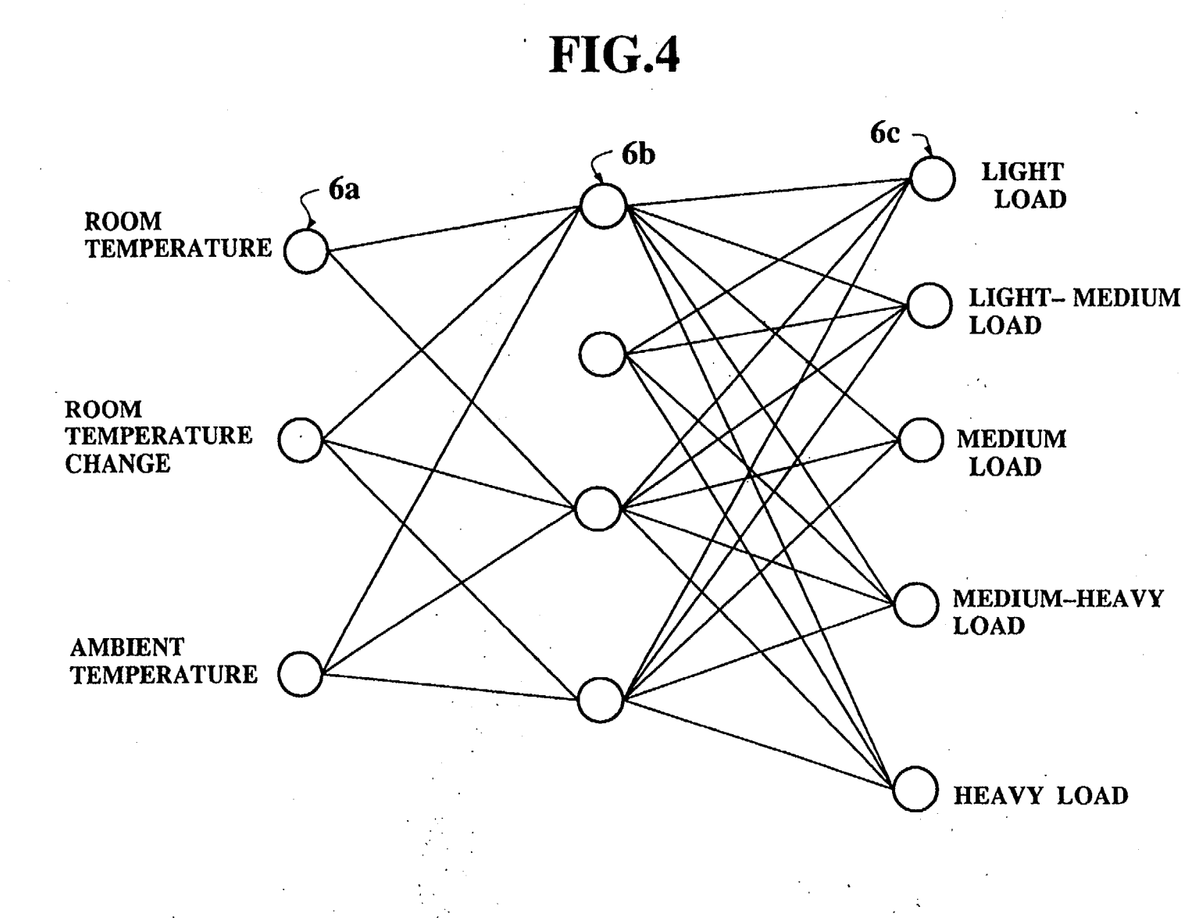
FIG. 4 is a view showing a neural network employed by the air conditioner controller of FIG. 3.

FIG. 4 shows the details of the neural network 6.

The neural network 6 comprises an input layer 6a, an intermediate layer 6b, and an output layer 6c. The input layer 6a receives the room temperature from the sensor 2, the temperature change from the circuit 10, and the outdoor temperature from the sensor 5. The output layer 6c involves light, light-medium, medium, medium-heavy, and heavy load output patterns, which are selected according to the data provided to the input layer 6a. Each of these output patterns indicates a relationship between a difference between a room temperature and a set temperature and the performance of the air conditioner.

Selection of the output patterns of the neural network 6 will be explained.

When the room temperature does not increase quickly in heating operation, the neural network 6 determines that load on the air conditioner is heavy and selects the heavy load output pattern. When the outdoor temperature is low and the setting room temperature high, the neural network 6 determines that the load is heavy and selects the medium-heavy load output pattern. When the room temperature quickly increases even with a slight increase in the compressor frequency, the neural network 6 determines that the load is light and selects the light load output pattern. When the outdoor temperature is high and the setting room temperature is low, the neural network 6 determines that the load is light and selects the light-medium load output pattern. When the room is facing north or large, the neural network 6 determines that the load is heavy and selects the heavy or medium-heavy load output pattern. When the room is facing south or small, the neural network 6 determines that the load is light and selects the light or light-medium load output pattern. In the other cases, the neural network 6 basically selects the medium load output pattern.

The neural network 6 stores these relationships and puts a weight factor on each relationship. The neural network 6 learns operation characteristics of the air conditioner by incrementing the weight factor of any relationship by one whenever an event corresponding to the relationship occurs.

According to the neural network 6 of FIG. 4, the input layer 6a comprises three layers, the intermediate layer 6b four layers, and the output layer 6c five layers. The structure of the neural network 6 is not limited by this.

Figure 5:
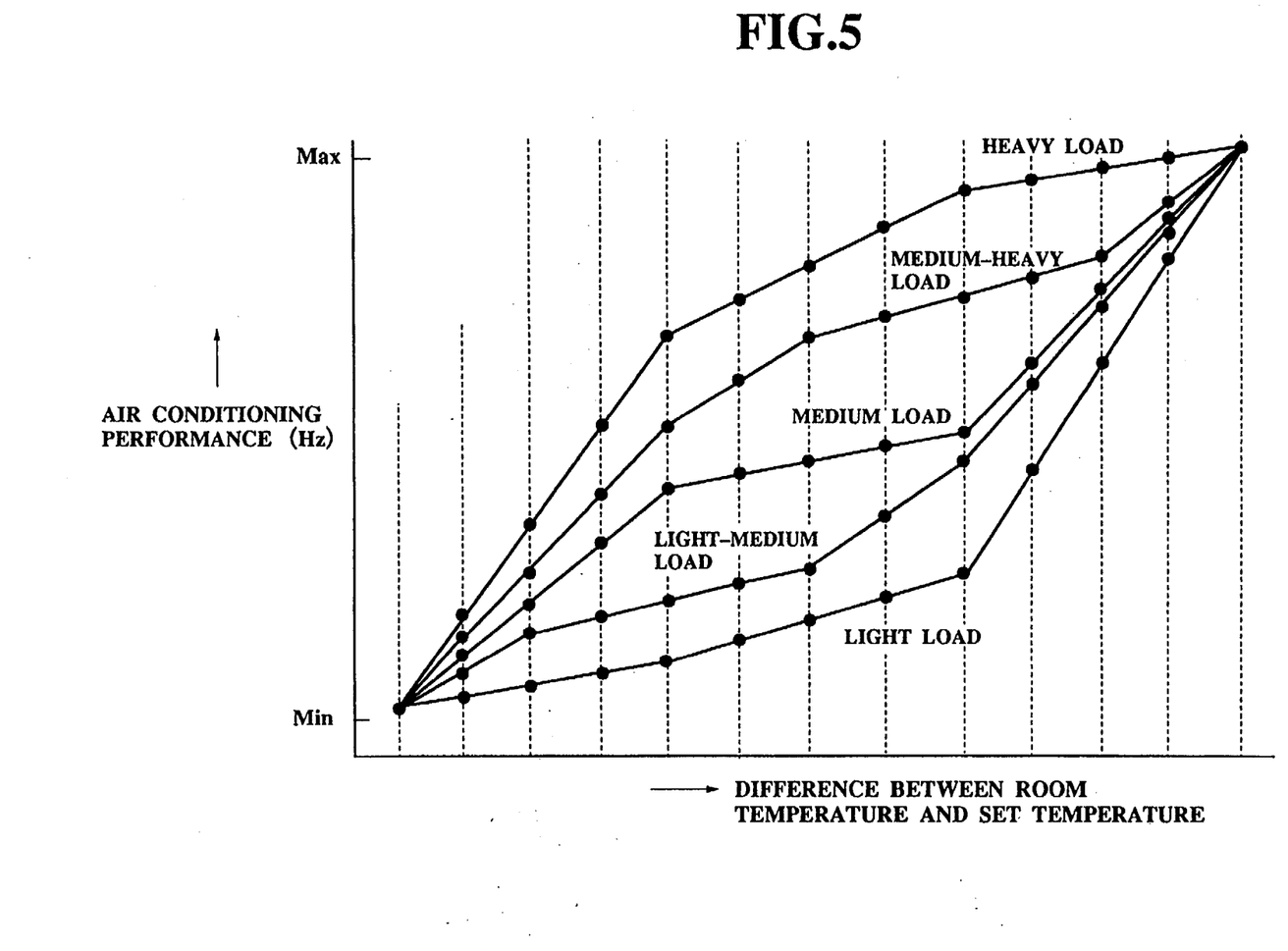
FIG. 5 is a graph showing input and output patterns of the neural network of FIG. 4, with an abscissa representing a difference between a room temperature and a set temperature and an ordinate representing a compressor operation frequency.

FIG. 5 is a graph showing operations of the compressor according to the load patterns provided by the neural network 6. In FIG. 5, an abscissa represents a difference between a room temperature and a set temperature; and an ordinate represents the performance of the air conditioner, i.e., the operation frequency of the compressor. In FIG. 5, there are five operation patterns for light load, light-medium load, medium load, medium-heavy load, and heavy load corresponding to the output patterns of the neural network 6. The number of the patterns is not limited to five.

According to the heavy load operation of FIG. 5, the compressor operation frequency gradually changes in a high frequency range. This means that the compressor operation frequency does not substantially change if a change in load on the air conditioner in the high frequency range is small, thereby stabilizing the performance of the air conditioner. According to the light load operation, the compressor operation frequency does not substantially change if a change in load is small in a low frequency range, thereby stabilizing the performance of the air conditioner. When the door of the air-conditioned room is opened, for example, under the light load operation, load on the air conditioner suddenly changes to rapidly increase the compressor operation frequency as shown on the right-hand side of FIG. 5, thereby quickly bringing the room temperature to the set temperature.

Figure 6:
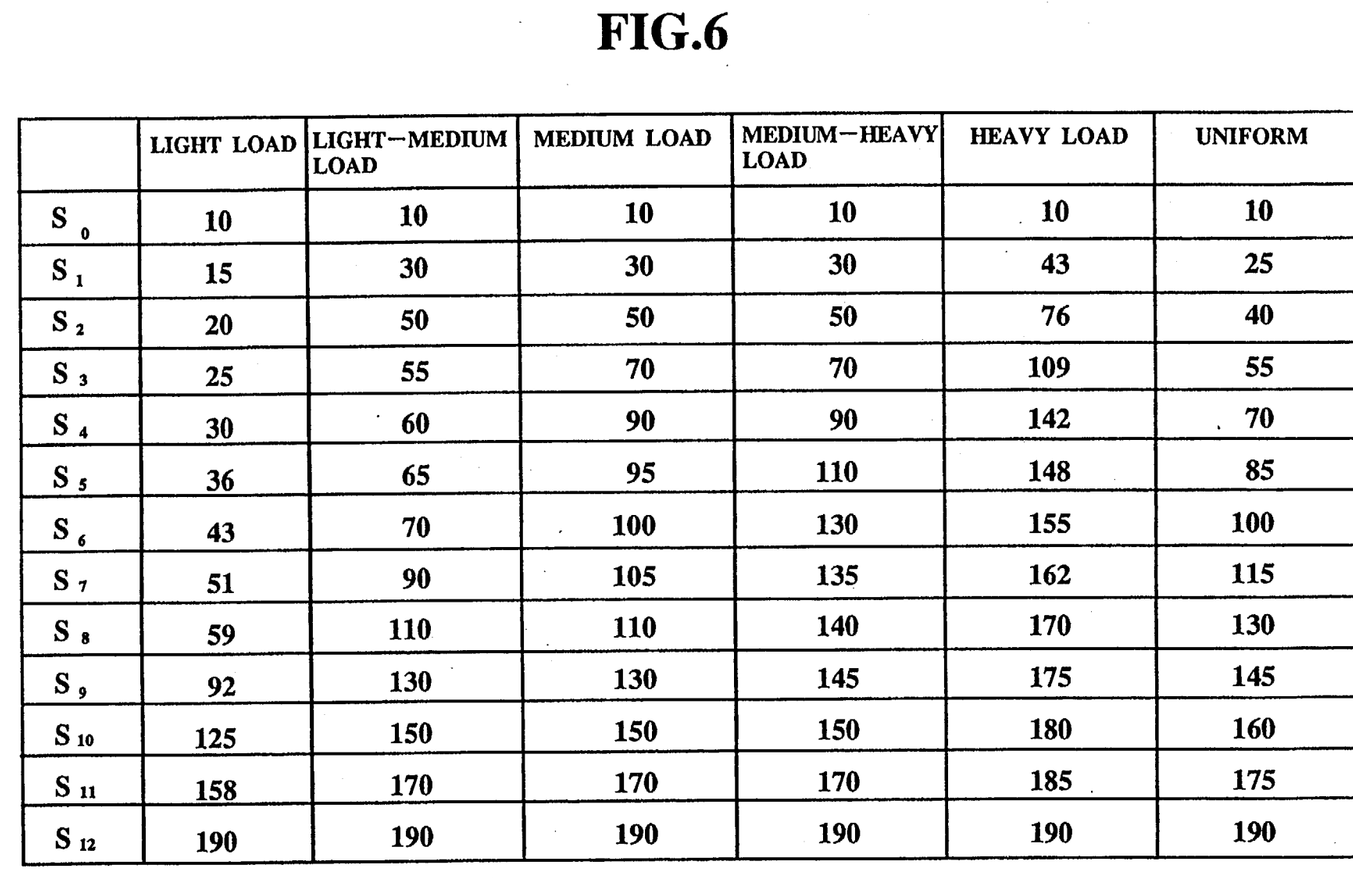
FIG. 6 is a table of frequencies allocated for the output patterns of FIG. 4.

FIG. 6 is a table showing frequencies allocated for the load patterns, respectively. In the table, the lowest frequency is 10 Hz, and the highest frequency is 190 Hz. Part of the table shows equally divided frequencies.

Returning to FIG. 3, an output of the neural network 6 is supplied to the control unit 7, which controls the operation frequency of the coolant compressor motor 9 through the variable frequency circuit 8. According to a difference between the set temperature entered through the manipulator 1 and the room temperature detected by the room temperature sensor 2, the performance of the air conditioner, i.e., the operation frequency of the compressor is determined depending on one of the output patterns. The circuit 8 provides an operation frequency to the compressor motor 9 accordingly.

As shown in FIG. 5, the compressor operation frequency is finely adjusted in a predetermined load range and roughly adjusted in the other load range. In this way, the operation frequency of the compressor is precisely controlled in various frequency ranges such as high, intermediate, and low frequency ranges to deal with various loads on the air conditioner. This control method quickly brings the room temperature to a set temperature and stably maintains the room temperature at the set temperature.

The neural network 6 learns characteristics of the air conditioner, and accordingly, selects one of the output patterns. Namely, the neural network 6 learns air conditioning states and changes in weight factors, to always best control the compressor of the air conditioner.

The air conditioner controller of FIG. 3 involves sensors for measuring a discharge temperature and a current to the compressor motor 9, a control valve for controlling a coolant flow, 4-way valves for switching cooling and heating operations from one to another, a fan motor for an outdoor unit, etc. These components are not shown in the figure for the sake of simplicity.

In this way, the invention finds a load pattern of an air-conditioned room, to properly operate an air conditioner. At the time of shipment, the air conditioner controller of the invention is set with the medium load operation pattern as an initial setting. As the air conditioner controller is operated, the operation patterns for light to heavy loads are selected depending on situations.

As explained above, the first embodiment of the invention learns characteristics of an air conditioner through a neural network according to a difference between a room temperature and a set temperature, a temporal change in the temperature difference, and an outdoor temperature, computes load on the air conditioner accordingly, and controls the operation frequency of a compressor of the air conditioner according to the load. The embodiment speedily brings the room temperature to the set temperature and stably maintains the room temperature at the set temperature. Unlike the prior art, the invention never unstably hunts the set temperature nor takes time to reach the set temperature. The air conditioner controller of the invention is capable of following changes in load on the air conditioner caused by seasonal factors and room arrangements. The invention always controls the room temperature to a set temperature.

Next, an air conditioner controller according to a second embodiment of the invention will be explained.

Figure 7:
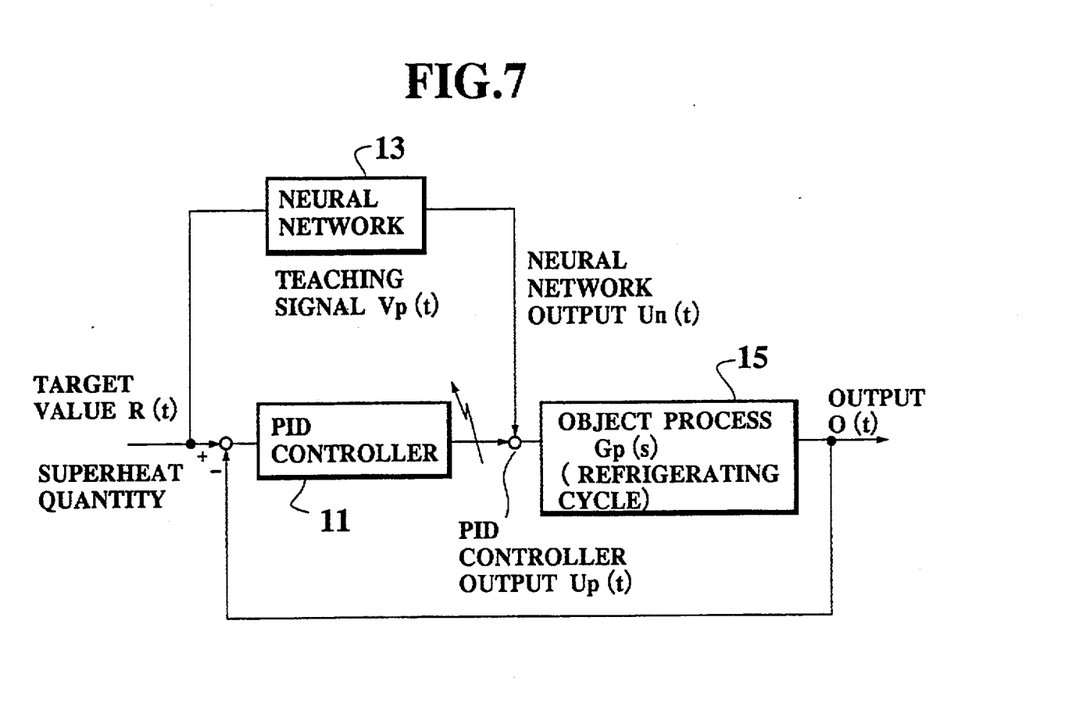
FIG. 7 is a block diagram showing an air conditioner controller according to a second embodiment of the invention.

FIG. 7 is a block diagram showing the air conditioner controller of the second embodiment. The second embodiment learns inverse characteristics of a refrigerating cycle of an air conditioner according to a feedback error, and according to a result of the learning, controls the refrigerating cycle.

The air conditioner controller of FIG. 7 comprises a conventional PID controller 11 and a neural network 13 connected in parallel with the PID controller 11. An output Un(t) of the neural network 13 and an output Up(t) of the PID controller 11 are supplied to an object process (a refrigerating cycle) 15 having a transfer characteristic Gp(S). An output of the refrigerating cycle 15 is fed back to an input.

The neural network 13 receives, for example, target values for superheat and room temperature, and learns characteristics of the air conditioner with the output Up(t) of the PID controller 11 serving as a teaching (teacher) signal, in a way to zero the output Up(t). By zeroing the output Up(t), the neural network 13 learns an inverse characteristic of the object process, i.e., a transfer characteristic Gp-1(S) from the output to the input, and zeros an input to the PID controller 11.

Figure 8:
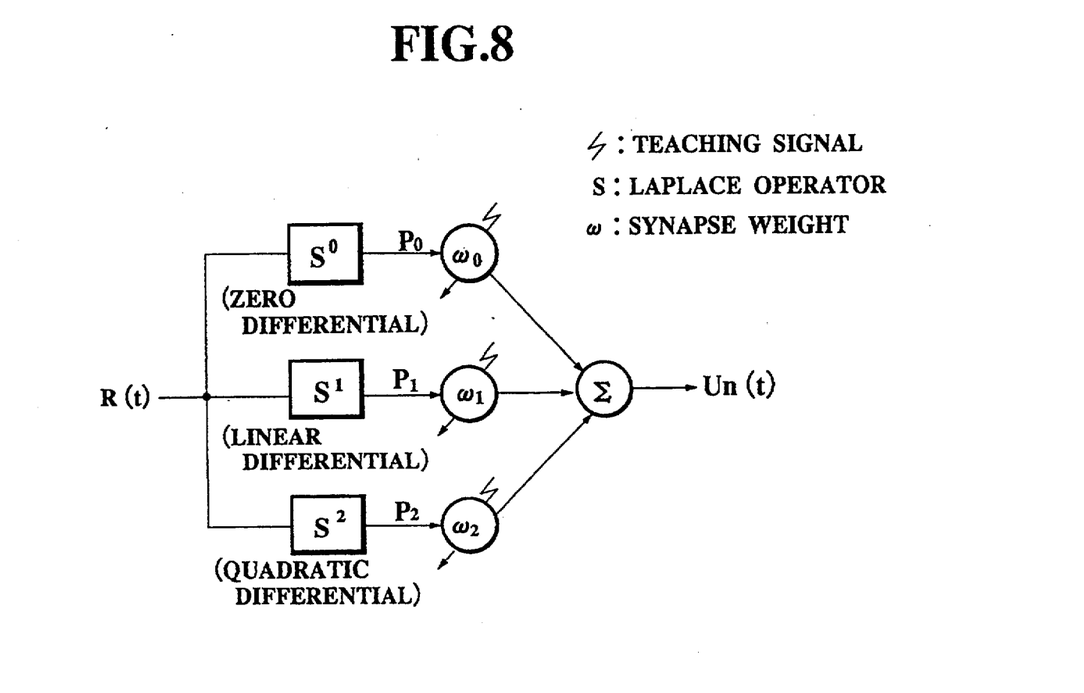
FIG. 8 is a view showing the details of a neural network of the air conditioner controller of FIG. 7.

FIG. 8 shows the details of the neural network 13 of FIG. 7.

The neural network 13 of FIG. 8 comprises an input layer involving a target value R(t), and an intermediate layer involving the input signal, a linear differential signal, and a quadratic differential signal. These signals are multiplied by synapse weights w0 to w2, to provide a sum signal Un(t). The synapse weights w0 to w2 are learned and updated according to the following equation:

$$\tau dw/dt = Pi \times Up(t)$$

where "i" is equal to one of 0 to 2, and "$\tau$" is a learning time constant.

The characteristics of the refrigerating cycle of the air conditioner are learned, and the characteristics are used for controlling the superheat, discharge temperature, capacity, defrosting, etc., of the refrigerating cycle.

Figure 9:
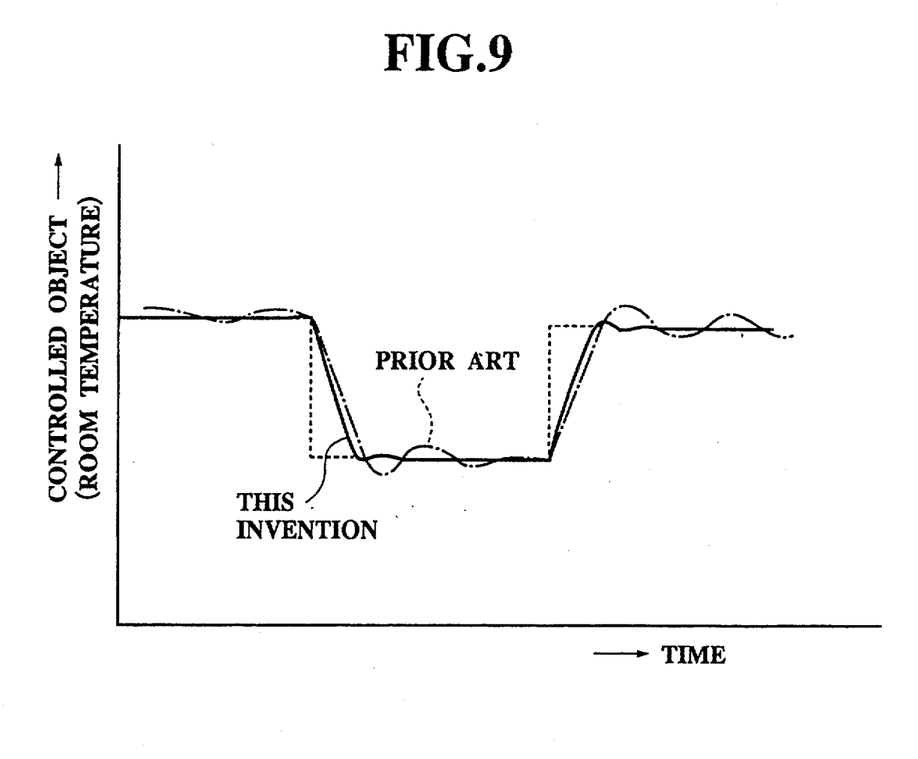
FIG. 9 is a view showing effect of the air conditioner controller of FIG. 7.

FIG. 9 shows characteristic curves for explaining effects of the second embodiment. In the figure, a set temperature is once decreased and then returned to the original level as indicated with a dotted line. A dash-and-dot line indicates a characteristic curve according to the prior art, and a continuous line indicates a characteristic curve according to the present invention. As is apparent in the figure, the present invention shows smaller undershoots and overshoots than the prior art. The effect of the invention is achievable not only in controlling the room temperature but also in controlling the superheat, discharge temperature, defrosting, etc., of the air conditioner.

In this way, the neural network of this embodiment learns various operation characteristics of a refrigerating cycle of an air conditioner, and according to a result of the learning, controls the air conditioner. More precisely, the neural network learns the refrigerating cycle under a given situation and controls the super heat, discharge temperature, etc., of the refrigerating cycle under the best mode for the given situation in consideration of a delay time, etc., specific to the given situation of the air conditioner. Also, this embodiment controls the performance of the air conditioner such as the operation frequency of a compressor of the air conditioner according to the characteristics of the air conditioner. The embodiment also controls defrosting according to the characteristics of the air conditioner. These effects are also achievable by learning inverse characteristics of the refrigerating cycle according to feedback errors.

As explained above, the second embodiment of the invention learns different operation characteristics of a refrigerating cycle of an air conditioner with use of a neural network, and controls the air conditioner according to a result of the learning. The air conditioner is best controlled according to a control constant properly selected for the air conditioner.

Various modifications will become possible for those skilled in the art after receiving the teachings of the present disclosure without departing from the scope thereof.

What is claimed is:

1. A controller of an air conditioner for adjusting a room temperature, comprising:
   (a) load computation means employing a neural network for learning operation characteristics of the air conditioner according to a difference between the temperature of an air-conditioned room and a set temperature, a temporal change in the temperature difference, and an outdoor temperature, and computing load on the air conditioner according to a result of the learning; and
   (b) control means for controlling the performance of the air conditioner by controlling the operation frequency of a coolant compressor according to the load computed by the load computation means, thereby speedily bringing the room temperature to the set temperature and stably maintaining the room temperature at the set temperature.

2. The controller according to claim 1, wherein the neural network of the load computation means learns operation characteristics of the air conditioner according to a difference between the room temperature and the set temperature, a temporal change in the temperature difference, and an outdoor temperature, and selects one from a plurality of output patterns according to a relationship determined by weight factors that are updated according to a result of the learning.

3. The controller according to claim 2, wherein the output patterns involve light load, light-medium load, medium load, medium-heavy load, and heavy load output patterns.

4. The controller according to claim 3, wherein the neural network selects the heavy load output pattern when the room temperature does not quickly increase even if the compressor is driven at a high frequency in a heating operation, the heavy load output pattern when the ambient temperature is low and the setting room temperature high, the light load output pattern when the room temperature quickly increases even with a slight increase in the compressor operation frequency, the light-medium load output pattern when the outdoor temperature is high and the setting room temperature is low, one of the heavy and medium-heavy load output patterns when the air-conditioned room faces north or is large, and one of the light and light-medium load output patterns when the air-conditioned room faces south or is small.

5. The controller according to claim 4, wherein each of the weight factors is incremented by one whenever a corresponding event occurs.

6. A controller for controlling an air conditioner installed in a room comprising:
   a manipulator for presetting a temperature desired in said room;
   a room temperature sensor for measuring a room temperature in said room;
   an ambient temperature sensor for measuring an outdoor temperature;
   control means connected to said manipulator, said room temperature sensor, said ambient temperature sensor and said air conditioner in order to adjust a driving power of said air conditioner in accordance with a difference between an actual temperature in said room and the desired temperature preset, a relationship between the driving power and the differential temperature being determined in accordance with one selected from among a plurality of patterns;
   a room temperature change computation circuit connected to said room temperature sensor for computing a temperature change in the room temperature;
   a neural network connected to said room temperature sensor, said ambient temperature sensor, said room temperature change computation circuit and said control means in order to determine an appropriate one of said patterns through learning and to inform said control means of the appropriate pattern to be selected for said room.

7. The controller as claimed in claim 6 wherein said patterns are represented by different curves in a plane of the driving power of said air conditioner and the difference between the room temperature and the desired temperature.

8. The controller as claimed in claim 7 wherein each curve starts from a common minimum driving power of said neural network and terminates in a common maximum driving power of said neural network with a different passage therebetween.

* * * * *